3,139,380
CALCIUM SULPHOSUCCINATE COMPOSITION
AND METHOD OF USING SAME
André Henri Passedouet, Viroflay, France, assignor to Societe de Produits Chimiques et de Synthese, Bezons, France, a French society
No Drawing. Filed June 12, 1961, Ser. No. 116,257
Claims priority, application France July 15, 1960
2 Claims. (Cl. 167—55)

The present invention relates to pharmaceutical compositions for the treatment of calcium deficiencies and which, more generally, enable large amounts of calcium to be taken up by living organisms.

The novel pharmaceutical compositions according to the invention comprises, as active ingredient, the neutral or substantially neutral calcium salts of sulphosuccinic acid $HO_3S—CH(COOH)—CH_2COOH$.

These salts are obtained by the salification of the sulphosuccinic acid with calcium oxide, calcium carbonate or any other basic calcium compound so as to obtain a combination which, in solution, has a pH compatible with the intended mode of administration. Thus for intramuscular and intravenous injections, the pH should be adjusted to a value very close to 7, whilst for oral administration, salts having pH's from 5 to 8 may be used. This possibility of adjusting the pH of the calcium salts of sulphosuccinic acid about neutrality, arises from the structure of sulphosuccinic acid which is a tribasic organic acid and acts as a buffer in combination with strong bases.

Numerous calcium salts used therapeutically are salts of monobasic acids which do not have such a marked buffer effect and which, in solution, may develop injurious variations in pH, particularly under the influence of hydrolyzing conditions.

The neutral calcium salt of sulphosuccinic acid has the empirical formula $C_8H_6Ca_3S_2$ and its structural formula is:

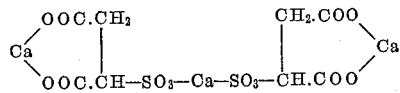

It exists in an anhydrous form and also in hydrated form with three molecules of water of crystallization.

Neutral calcium sulphosuccinate has the advantage of very great solubility in water; at ordinary temperature 100 g. of the trihydrate dissolve in 100 g. of water. Concentrated solutions readily exhibit supersaturation but the 10% solution withstands temperature variations between 0° and 100° without precipitation. Solutions of about 5% concentration, which are convenient for therapeutic use, have an indefinite stability on storage, whereas it is known that many calcium salts used in medicine have to be kept in solution by more or less reliable supersaturation devices.

Another advantage of neutral calcium sulphosuccinate is its high calcium content: 23.55% in the anhydrous salt, which enables large doses of calcium to be administered in a small volume. This is particularly valuable in the case of intramuscular injections.

The substantially neutral calcium salts of sulphosuccinic acid may be obtained by any suitable method. Thus one suitable method comprises neutralizing sulphosuccinic acid in a boiling aqueous solution with excess calcium carbonate, filtering the solution and separating the calcium salt formed by evaporation or by precipitation with ethyl alcohol in which it is insoluble.

The novel pharmaceutical composition according to the invention may be offered in various forms: for example, ampoules of a solution in distilled sterlized water, suitable for administration by injection; a drinkable solution in a bottle; lozenges, pills, tablets of the powdered product; and suppositories made with an excipient such as cacao butter or polyoxyethylene waxes.

Neutral calcium sulphosuccinate is a very stable substance which is resistant to sterilization, preservation and to oxidation by the air. It has very little chemical reactivity and is compatible with other neutral medicaments thus enabling it to be used medicinally in association with other ingredients favourable to the action of the calcium or having a complementary physiological activity.

Neutral calcium sulphosuccinate shows very little toxicity in animals, however it is administered. In man there is the same absence of toxicity and an absence of even slight signs of intolerance. This remarkable tolerance is found in subjects who had proved unfavourably sensitive the other calcium medication. The association of treatment with calcium sulphosuccinate with other therapeutic treatments in numerous patients has not revealed any incompatibility.

The therapeutic effect of the pharmaceutical composition according to the invention is excellent and is manifested, for example, by an increase in weight with an increase in appetite, sthenic effect, improvement in the general condition, and/or improvement in the neurotonic condition.

The production of the new pharmaceutical composition, its pharmacological properties and its clinical effects on man are illustrated in the following illustrative examples.

*Example 1*

A 5% solution of neutral calcium sulphosuccinate in distilled water was prepared and a certain number of sealed 5 cc. ampoules of this solution were prepared. ⅓ of the ampoules were left in store as they were. At the beginning of storage, the pH of the solution was 7.8 and at the end of 90 days it had dropped slightly to become stationary at 7.2. Another third of the ampoules were sterilized at 110°, in this case the pH remained uniformly at 7.8, even after 90 days. Finally, the last third of the ampoules were sterilized at 125°; the pH likewise remains without variation at 7.8. The sterilized ampoules stored 90 days did not show the development of any colouration and the ultra-violet spectra likewise remained identical. After sterilization and storage, a chemical analysis was carried out to discover whether any chemical deterioration had taken place. The test for carbonates proved negative; no decarboxylation of the product had taken place. The sulphite content which originally was approximately 1 part in a million (1 p.p.m.), remained unchanged; there was therefore no hydrolysis of the sulphinic group in the sulphosuccinic acid.

These results show the stability of the solutions of neutral calcium sulphosuccinate to sterilization and to preservation, which conditions are necessary for the production of a pharmaceutical product intended for injection.

*Example 2*

The toxicity of neutral calcium sulphosuccinate was determined in mice by intravenous injection of a 5% solution into the tail vein of the animal. The dose was administered to batches of 12 mice at the rate of 2 to 8 centigrams respectively of dry product per 100 g. by weight. The lethal dose is found to be 50 (LD 50) which is 4.5 cg. to 100 g. weight of animal. This very limited toxicity is the known toxicity of the element calcium, the organic part of the molecule not playing any part.

Example 3

The effect of the composition on calcemia in dogs was studied. A 5% solution of neutral calcium sulphosuccinate was administered by intrasaphenous means to four dogs, 3.4 mg. of anhydrous salt being administered per kg. of animal. The calcium in the blood was measured 15 seconds, 30 seconds, 1 hour and 3 hours after the injection. In the four cases, practically no variation in the calcemia was found which indicated assimilation and fixation of the calcium element.

Example 4

After a 5% solution of neutral calcium sulphosuccinate had been injected by intrasaphenous means, the immediate action on the function of some of the organs of dogs was examined. The doses were 2.5 mg., 5 mg. and 10 mg. per kg. of animal. In four animals, no modification was found in: the respiration, the intestinal mobility, the renal volume, and the blood pressure. With a dose of 20 mg. per kg. a slight acceleration in the respiration was observed and a temporary cessation in the intestinal movements, with more feeble resumption.

Example 5

A clinical study of neutral calcium sulphosuccinate covered 35 patients (16 men and 19 women) over a period of 90 days. The substance administered by venous means in a dose of 5 cc. or 10 cc. of 5% solution, the injections being carried out either every day or every other day according to circumstances. The patient felt a slight impression of burning under the tongue or at the level of the front part of the neck during the injection; this effect is comparable with that produced by other calcium derivatives injected by venous means, but is diminished in intensity. In none of the cases was there any accident or even a slight incident, and there was no lipothymic impression. No modification in the essential biological constants was observed and there was excellent general tolerance even in delicate patients.

Example 6

Under the general conditions of treatment defined in Example 5, the development of patients was followed, noting their general condition and their increase in weight.

*Case 1—Gastritis, following viral hepatitis with incipient cirrhosis.*—A calcium and hepato-therapeutic treatment was instituted for 40 days. After 60 days of treatment with calcium sulphosuccinate, there was an increase in weight of 2 kg. 300.

*Case 2—Tubercular meningitis.*—A long course of calcium treatment associated with streptomycin was carried out followed by treatment with isoniazide, the patient was cured. After 45 days of calcium sulphosuccinate, the increase in weight was 2 kg. 900.

*Case 3—Discal sciatica.*—Calcium sulphosuccinate had a beneficial effect on the general conditions of the patient and the pain was somewhat modified. Increase in weight of 3 kg. in 15 days.

*Case 4—Goitre without endocrine trouble in an unstable neurotonic patient.*—Increase in weight of 1 kg. 400 in 15 days.

*Case 5—Contracture, probably hysterical, of the right upper member.*—Great improvement in the psychiatric syndrome (psychotherapy and isolation combined). Increase in weight of 1 kg. 400 in 12 days.

*Case 6—Emaciation and asthenia connected partially with the social question.*—Considerable improvement in the appetite. Increase in weight of 2 kg. 200 in 1 month.

In general, the composition according to the invention has a favourable sthenic effect, generally leads to an improvement in the appetite, has sedative effect on the neurovegetative system, and is useful in minor anxiety cases.

Example 7

Treatment with calcium sulphosuccinate produced the following results, in association with other medicaments.

*Case 7—Serious nutritional anaemia.*—Great improvement through treatment with folic acid and additional calcium treatment. After 45 days of treatment under the conditions in Example 5 with calcium sulphosuccinate, the increase in weight was 5 kg. 700.

*Case 8—Hyperthyroidism.*—21 days of injections of calcium sulphosuccinate after a course of treatment with radioactive iodine. There was a very great improvement in the clinical condition, weight (increase of 3 kg. 700) and neurotonic.

What I claim is:

1. An injectable pharmaceutical composition for calcium therapy comprising a 5% solution of the neutral calcium salt of sulphosuccinic acid in sterile distilled water.

2. Method of treating calcium deficiencies which comprises administering calcium sulphosuccinate to a calcium-deficient subject.

References Cited in the file of this patent

UNITED STATES PATENTS

| | | |
|---|---|---|
| 2,137,957 | Seydel | Nov. 22, 1938 |
| 2,675,320 | Christopher | Apr. 13, 1954 |